(12) United States Patent
Luo et al.

(10) Patent No.: US 10,884,889 B2
(45) Date of Patent: Jan. 5, 2021

(54) ALLOCATING PART OF A RAID STRIPE TO REPAIR A SECOND RAID STRIPE

(71) Applicant: Seagate Technology LLC, Cupertino, CA (US)

(72) Inventors: Ruiling Luo, Louisville, CO (US); Ian Davies, Longmont, CO (US); Thomas George Wicklund, Longmont, CO (US); Douglas Dewey, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 246 days.

(21) Appl. No.: 16/016,012

(22) Filed: Jun. 22, 2018

(65) Prior Publication Data

US 2019/0391889 A1    Dec. 26, 2019

(51) Int. Cl.
*G06F 11/20* (2006.01)
*G06F 3/06* (2006.01)

(52) U.S. Cl.
CPC .......... *G06F 11/2094* (2013.01); *G06F 3/064* (2013.01); *G06F 3/0619* (2013.01); *G06F 3/0631* (2013.01); *G06F 3/0689* (2013.01); *G06F 2201/82* (2013.01)

(58) Field of Classification Search
CPC ......... G06F 11/20; G06F 11/2094; G06F 3/06
USPC ........................................ 714/6.24
See application file for complete search history.

(56) References Cited

U.S. PATENT DOCUMENTS

| | | | |
|---|---|---|---|
| 6,850,443 B2 | 2/2005 | Lofgren | |
| 7,188,270 B1* | 3/2007 | Nanda | G06F 11/1076 711/114 |
| 7,287,118 B2 | 10/2007 | Chang et al. | |
| 7,315,917 B2 | 1/2008 | Bennett et al. | |
| 7,649,794 B2 | 1/2010 | Yeh | |
| 8,051,241 B2 | 11/2011 | Feldman et al. | |
| 8,301,830 B2 | 10/2012 | Feldman et al. | |
| 9,841,908 B1 | 12/2017 | Zhao et al. | |
| 10,496,482 B1* | 12/2019 | Foley | G06F 11/1092 |
| 10,521,145 B1* | 12/2019 | Foley | G06F 3/0644 |
| 2003/0120863 A1* | 6/2003 | Lee | G06F 11/1084 711/114 |
| 2003/0231529 A1* | 12/2003 | Hetrick | G06F 11/1662 365/200 |
| 2005/0050383 A1* | 3/2005 | Horn | G06F 11/2087 714/6.22 |

(Continued)

OTHER PUBLICATIONS

File History for U.S. Appl. No. 12/437,040.

(Continued)

*Primary Examiner* — Kamini B Patel
(74) *Attorney, Agent, or Firm* — Mueting Raasch Group

(57) ABSTRACT

Managing a redundant array of independent disks (RAID) storage array involves assigning first and second stripes to span respective first and second sets of disks. A subset of drives in the first set fails such that the first stripe is in a first state wherein a failure of another drive in the first set will lead to data loss in the first stripe. It is determined that the second stripe is in a fault-tolerant state such that the second stripe can have failures of two drives in the second set before the second stripe is in the first state, Part of an operational disk of the second set used by the second stripe is allocated to the first stripe to replace at least part of the subset of failed drives.

20 Claims, 8 Drawing Sheets

(56) References Cited

U.S. PATENT DOCUMENTS

| | | | |
|---|---|---|---|
| 2006/0155917 A1 | 7/2006 | Di Sena et al. | |
| 2007/0050543 A1* | 3/2007 | Pomerantz | G06F 3/0685 |
| | | | 711/114 |
| 2008/0235432 A1 | 9/2008 | Chen et al. | |
| 2008/0276035 A1 | 11/2008 | Hobson | |
| 2008/0276038 A1 | 11/2008 | Tanaka et al. | |
| 2008/0282024 A1 | 11/2008 | Biswas et al. | |
| 2008/0282025 A1 | 11/2008 | Biswas et al. | |
| 2008/0313505 A1 | 12/2008 | Lee et al. | |
| 2008/0320209 A1 | 12/2008 | Lee et al. | |
| 2008/0320214 A1 | 12/2008 | Ma et al. | |
| 2009/0013233 A1 | 1/2009 | Radke | |
| 2009/0031076 A1 | 1/2009 | In et al. | |
| 2010/0070703 A1* | 3/2010 | Sarkar | G06F 3/0656 |
| | | | 711/114 |
| 2010/0100677 A1* | 4/2010 | McKean | G06F 3/0647 |
| | | | 711/114 |
| 2010/0174845 A1 | 7/2010 | Gorobets et al. | |
| 2010/0191897 A1 | 7/2010 | Zhang et al. | |
| 2010/0251012 A1* | 9/2010 | Zwisler | G06F 11/1092 |
| | | | 714/6.32 |
| 2012/0079318 A1* | 3/2012 | Colgrove | G06F 3/0646 |
| | | | 714/6.22 |
| 2012/0084506 A1* | 4/2012 | Colgrove | G06F 11/3034 |
| | | | 711/114 |
| 2012/0272038 A1* | 10/2012 | Wei | G06F 3/0647 |
| | | | 711/206 |
| 2013/0227346 A1* | 8/2013 | Lee | G06F 11/108 |
| | | | 714/6.24 |
| 2016/0092326 A1 | 3/2016 | Wu et al. | |
| 2017/0308436 A1 | 10/2017 | Agombar et al. | |
| 2018/0165169 A1* | 6/2018 | Camp | G06F 11/2069 |
| 2019/0220207 A1* | 7/2019 | Lingarajappa | G06F 3/0614 |

OTHER PUBLICATIONS

Frequently Asked Questions, Corsair, USB Flash Wear-Leveling and Life Span, Jun. 2007, pp. 1-2.

White Paper, Sandisk Flash Memory Cards, Wear Leveling, Oct. 2003, pp. 1-6.

* cited by examiner

ALLOCATING PART OF A RAID STRIPE TO REPAIR A SECOND RAID STRIPE

SUMMARY

The present disclosure is directed to allocating part of a non-critical raid stripe to repair a second raid stripe in critical state. In one embodiment, managing a redundant array of independent disks (RAID) storage array involves assigning a first stripe to span a first set of disks and assigning a second stripe to span a second set of disks. A subset of failed drives in the first set is determined to have failed such that the first stripe is in a critical state where a failure of another drive in the first set will lead to data loss in the first stripe. It is determined that the second stripe is in a fault-tolerant state such that the second stripe can have failures of two drives in the second set before the second stripe is in the critical state. Part of an operational disk of the second set used by the second stripe is allocated to the first stripe to replace at least part of the subset of failed drives.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage server systems. Data storage systems generally use redundant array of independent disks (RAID) configuration that assembles multiple physical disks into one or more volumes. Various different RAID configurations are known that provide either increased performance (e.g., RAID level 0) or increased reliability (e.g., RAID levels 1, 5, 6, etc.). The multiple drives are presented as a logical volume that is treated by the host operating system as a single drive. For example, a RAID-1 setup presents two or more disks as a single disk, and the data is mirrored across all of the two or more disks such that in the event of the failure of one of the disks, the remaining one or more disks will have the previously stored data and continue to operate as a storage volume.

Figure 1:
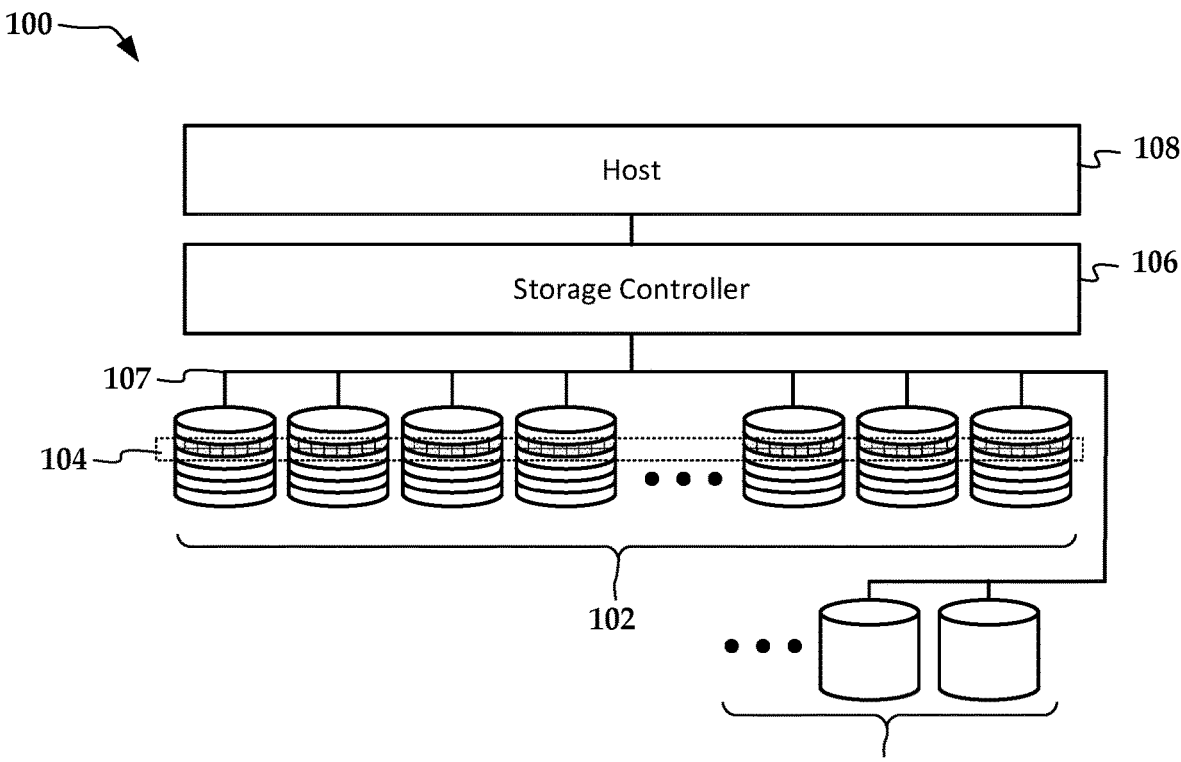
FIG. 1 is a block diagram of a system and apparatus according to an example embodiment.
Figure 2:
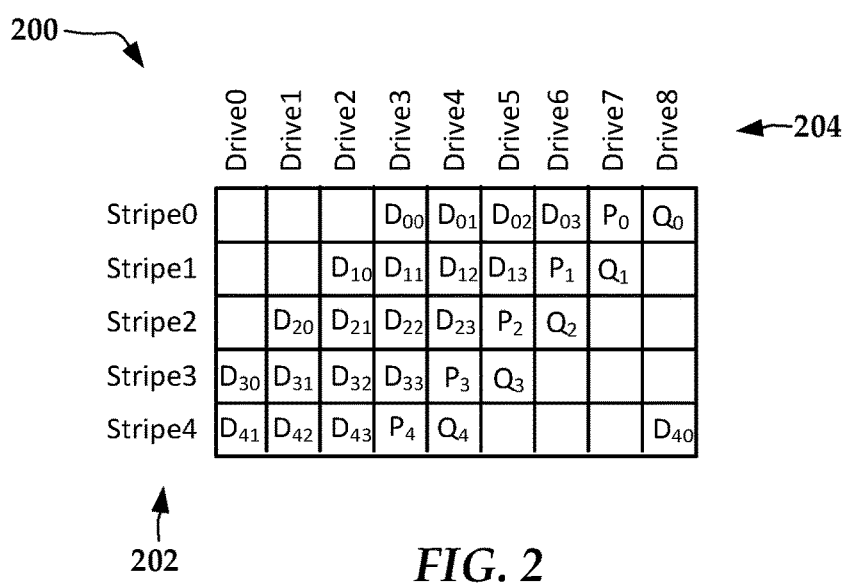
FIGS. 2, 3 and 4 are block diagrams showing recovery of a drive array in response to a failed disk according to example embodiments.

In the following embodiments, a storage server is described that uses a RAID controller with additional features described herein. An example of such a storage system 100 is shown in the block diagram of FIG. 1. The system 100 includes a plurality of drives 102 that are mapped to multiple logical volumes. An example logical volume 104 is shown spanning the drives 102. The shaded regions within the logical volume 104 indicate disk regions, often referred to as "chunks," that store a portion of the data of the logical volume 104, which may be referred to as a "stripe." A storage controller 106 is coupled to the drives 102 via a storage bus 107 and manages, among other things, the definition of the logical volumes, translation of read and write requests between the logical block addresses used by a host 108 and the addresses sectors of the disks 102 (which themselves are logical block addresses), calculation and verification of parity data, etc.

The storage system 100 is often fitted with spare capacity 110. The spare capacity 110 may include empty disks (generally referred to as "hot spares") or parts of currently-used disks 102 that are not currently utilized for storage (e.g., empty or can be erased/overwritten on demand) but kept powered and coupled to the local drive bus such that the controller 106 can access the spare capacity 110 at any time. For example, if one of the active drives 102 fails (or a partition thereof), then the storage controller 106 can reproduce data previously stored on the partition(s) of the failed drive 102 onto one or more partitions of spare capacity 110 (e.g., using data and/or parity from other stripes in the array 102). The partition(s) of the spare capacity 110 are then used in place of the failed drive partition(s). This reduces the amount of available spare capacity 110, at least until the failed drive is physically replaced, in which case a replacement drive can be added back to the system and be incorporated into the spare capacity 110.

The amount of spare capacity 110 may be defined by the end user when the system 100 is first configured. Generally, an increased amount of spare capacity 110 ensures long-term reliability, but at the expense of storage capacity within the array enclosure. For example, a predetermined amount of spare capacity may be defined to ensure specified capacity is provided for five years, e.g., based on estimated failure rates of the drive. However, this number may be derived from a worst-case scenario, and as such may result in a significant amount of storage going unused in some installations. As such, the end user may decide to provide a smaller amount of spare capacity 110 relative to the total number of operational drives 102. This can maximize storage capacity, although in increases risk of data loss.

Generally, it is desirable to configure storage arrays with less initial overprovisioning (spare space) yet still have the arrays last a similar amount of time in the field as an array that has more overprovisioning. This reduces initial costs and can be useful in no-touch or low-touch environments, such as very large storage installations where it may not be cost-effective to have technicians find and replace failed drives in the arrays. The features described below reduce the acquisition cost and operating costs of products and provide improved fault tolerance in cases where spare capacity is low and two drives have failed.

In a distributed RAID system with two-disk redundancy (e.g., RAID-6) where two disks have failed, the system will rebuild the lost data chunks (data or parity) and store the reconstructed chunks in space from spare capacity. In order to most effectively protect user data, the system may first fix critical stripes (stripes with two failed chunks) before fixing degraded stripes (stripes with a single failed chunk.) If the disk group has enough spare capacity, critical stripes may be brought back to a fault-tolerant state (both bad chunks fixed at the same time), but if it's low on capacity (or operating in a more conservative mode) then critical stripes will only be returned to degraded (one chunk failed) state. If the drive pool runs out of spare capacity before the rebuild is complete (e.g. due to prior disks failures or varying disks sizes) the rebuild activity will stop. This may leave some stripes at a "critical" state meaning that if an additional disk fails, data will be lost.

This disclosure presents a method to allow rebuild activity to continue such that, even if spares are depleted, stripes can be kept out of the critical state by degrading the health of fault-tolerant stripes. This can be a useful tradeoff, because having any stripes critical exposes customers to data loss with one more device failures, while degraded stripes can tolerate a device failure with no data loss. The new algorithm takes chunks (disk zones) from fault tolerant stripes and reassigns them to critical stripes. The result is that the number of degraded stripes will increase, but the number of critical stripes will decrease—ideally to zero.

In traditional RAID systems all stripes that share the same number of failed drives/chunks have the same health state—e.g., for RAID-6, either all fault-tolerant (zero failed chunks), all degraded (one failed chunk) or all critical (two-failed chunks). Rebuild will only proceed if spare devices are available. Such systems may not allow varying capacity disks to be used, and may also restrict spare capacity to integer numbers of a single disk.

In a disk controller according to an example embodiment, large groups of sequential RAID stripes are managed as "stripe zones." A disk array can contain many thousands of stripe zones. Each stripe zone can for many purposes be considered as a traditional RAID-6 disk group—it may contain many sequential stripes (with rotating P/Q redundancy) over the same set of drives. The controller loops over stripe zones rather individual RAID stripes checking for stripes to rebuild.

In FIGS. 2-6, block diagram show a representation of a drive array 200 according to an example embodiment. In this simplified example, five stripes 202 (Stripe0-Stripe4) are spread across nine disk drives 204 (Drive0-Drive8). Each block represents a portion (e.g., partition, radial zone) of the disks 204, each block being used as a chunk for the indicated stripes 202. The annotations $D_{xy}$ indicate the y-th data chunk for stripe x, and $P_x$ and $Q_x$ are the parity chunks for stripe x. Each stripe has four data chunks and two parity chunks. The stripes 202 may all be considered part of the same stripe zone, and empty blocks without any annotation may be used for other stripes within the same zone.

Generally, each of the stripes 202 is mapped to a corresponding set of the drives. For example, Stripe0 is mapped to the set $S_0$={Drive3, Drive4, Drive5, Drive6, Drive7, Drive8} and Stripe3 is mapped to the set $S_3$={Drive0, Drive1, Drive2, Drive3, Drive4, Drive5}. The illustrated sets partially overlap, e.g., $S_0 \cap S_3$={Drive3, Drive4, Drive5}. In other configurations, two sets $S_n$ and $S_m$ within a group may not overlap at all, e.g., $S_n \cap S_m$={ }, or may fully overlap, e.g., $S_n \cap S_m = S_n = S_m$.

Figure 3:
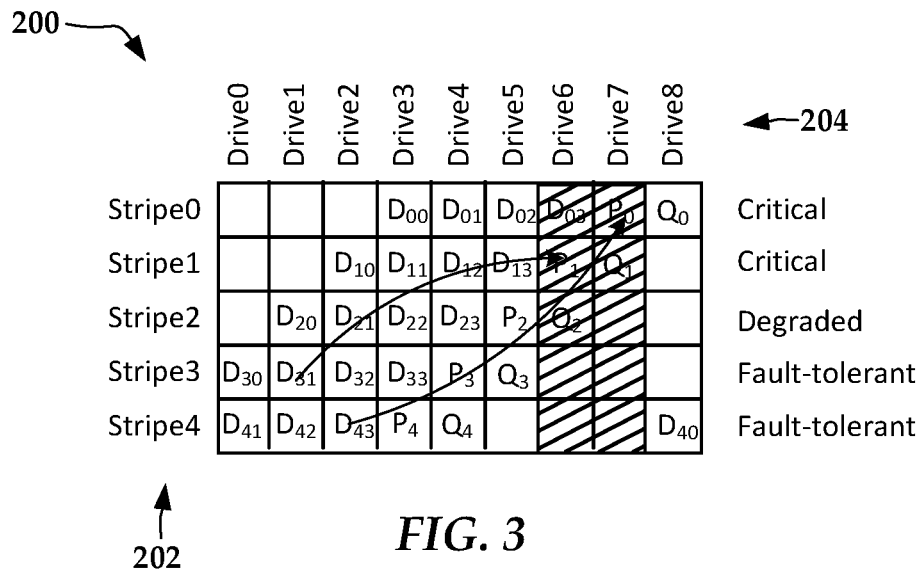
Figure 4:
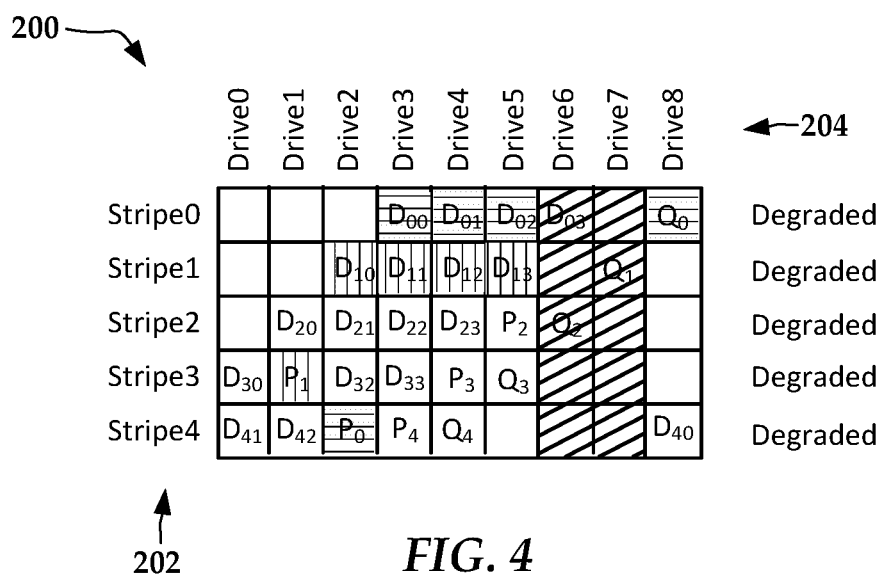

As seen in FIG. 3, Drive6 and Drive7 have failed as indicated by the hatched regions. As indicated by the annotations on the right hand side of the figure, this leaves Stripe0 and Stripe1 in a critical state, Stripe2 in a degraded state, and Stripe3 and Stripe4 in a fault-tolerant state. As will be describe in greater detail below, the controller will identify these states and use chunks from any fault tolerant stripes to put as many critical-states stripes into a degraded state as possible. As indicated by the arrows, this examples takes data chunk $D_{31}$ from Stripe3 and uses it to store data from chunk $P_1$ in Stripe1. This may involve treating chunk $D_{31}$ as a failed chunk for purposes of Stripe3, and then rebuilding chunk $P_1$ from remaining good chunks of Stripe1, and storing the rebuilt chunk $P_1$ in the space formerly used by chunk $D_{31}$. A similar operation is performed for $D_{43}$ from Stripe4, which is taken from Stripe4 and used to store data from chunk $P_0$ of Stripe0. As seen in FIG. 4, this results in all of the stripes 202 being in degraded mode. Note that the chunks now used by Stripe0 and Stripe1 are highlighted in FIG. 4 by respective horizontal and vertical hatching.

Figure 5:
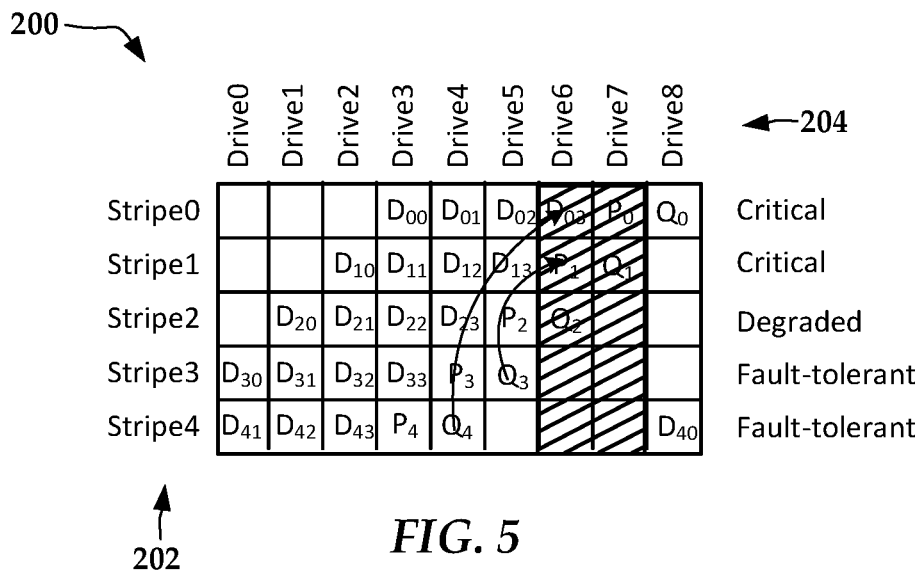
FIGS. 5 and 6 are block diagrams showing recovery of a drive array in response to a failed disk according to another example embodiment.
Figure 6:
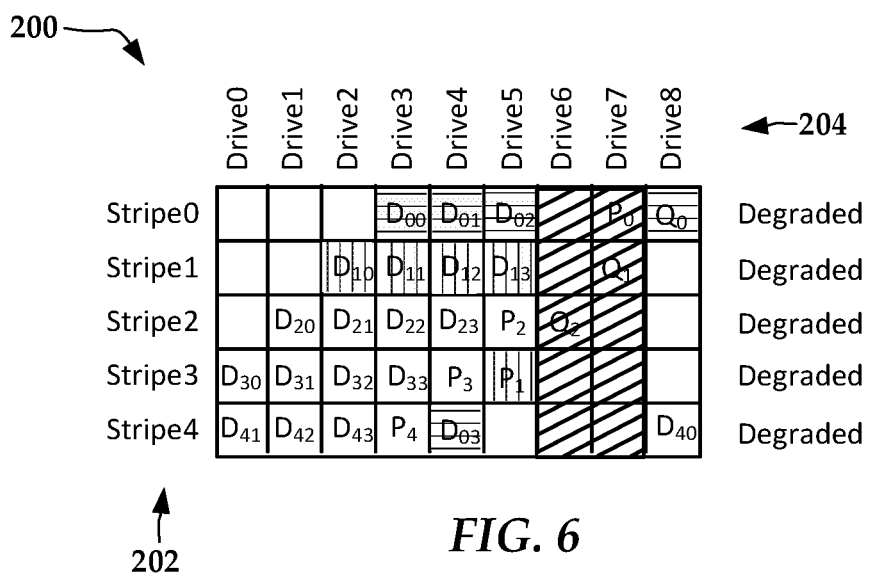

Note that the selection of data chunks $D_{31}$ and $D_{43}$ to replace parity chunks $P_0$ and $P_1$ in the above example may be somewhat arbitrary, and any combination of chunk types may be taken from fault-tolerant stripes and be used to repair critical stripes so long as the mapping rules of the distributed RAID system are adhered to. For example, the controller may configure the degraded modes stripes as RAID-5 stripes, with four data chunks and one parity chunk. As such, the controller may prioritize taking away a parity stripe from a fault-tolerant stripe such that the stripe can operate in a RAID-5 mode. This is shown in FIG. 5, where $Q_4$ is taken from Stripe4 and used to repair $D_{03}$ of Stripe0, and $Q_3$ is taken from Stripe3 and used to repair $P_1$ of Stripe1. As seen in FIG. 6, this results in all stripes 202 being in a degraded state with four data chunks and one parity chunk each.

Figure 7:
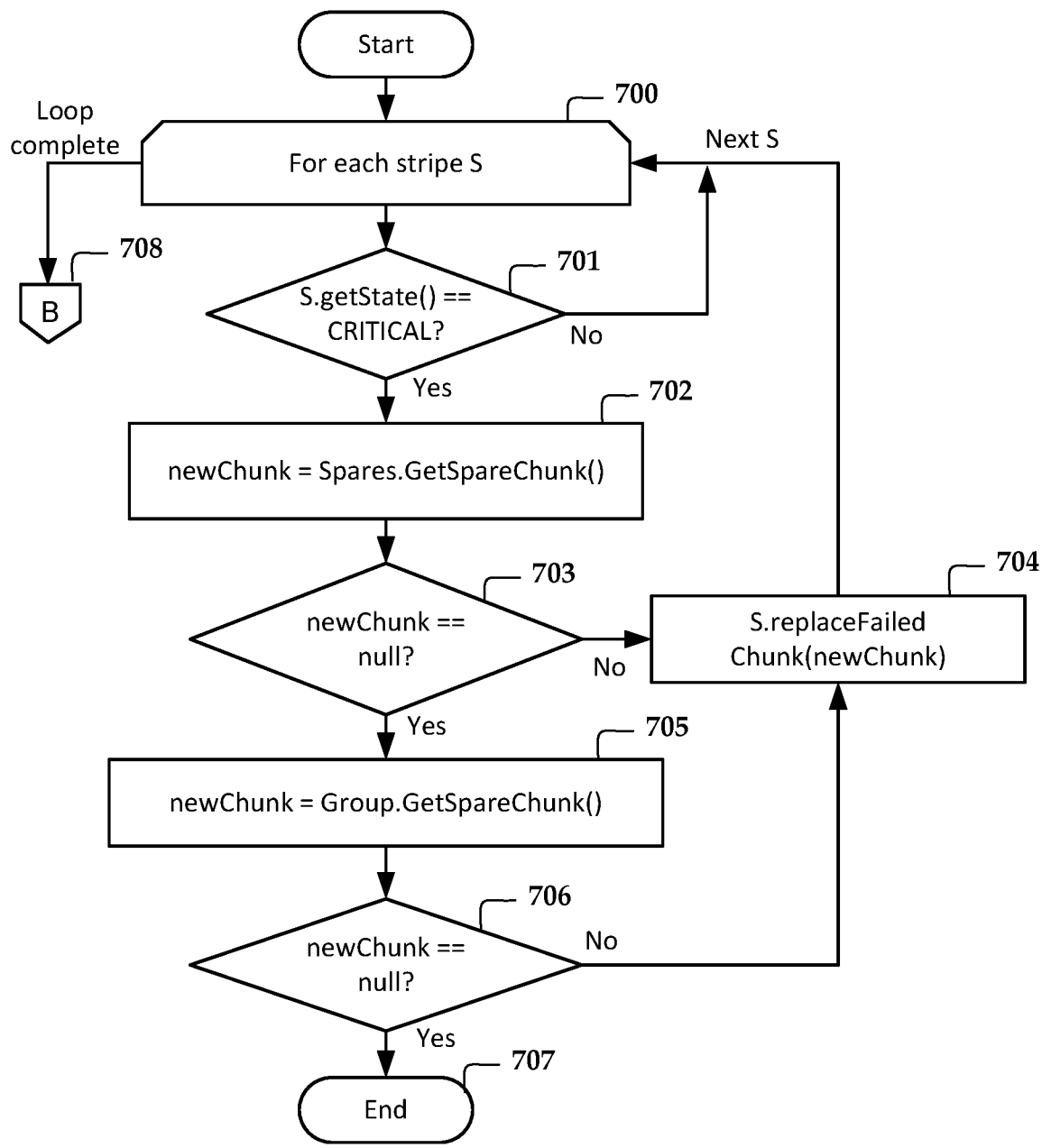
FIGS. 7, 8, 9, and 10 are flowcharts showing a drive array recovery process according to example embodiments.
Figure 8:
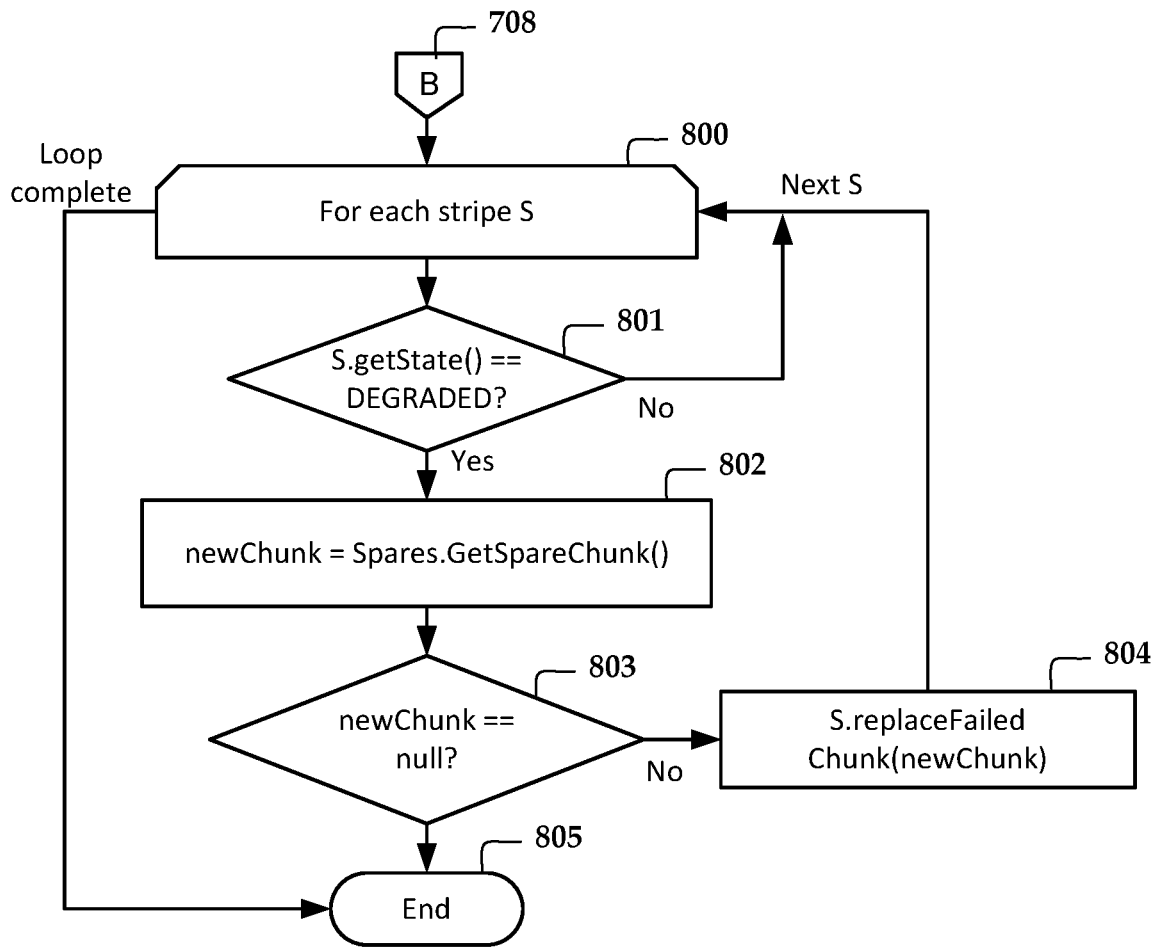

In FIGS. 7 and 8, flowcharts illustrate a rebuild process according to an example embodiment. Generally, the process involves two passes over all stripes in the disk group. The flowchart in FIG. 7 represents the first pass, which involves checking for stripes that are in a critical state (e.g., have lost two chunks of the stripe) and rebuilding one chunk of the stripe on spare space, either from hot spares or from another stripe that is in a fault tolerant state.

Block 700 of FIG. 7 represents a loop limit that iterates through each stripe in the group. At block 701, the stripe is tested to determine if it is in the critical state. If the stripe is critical, a retrieval of a new chunk from hot spares is attempted at block 702. This assumes the GetSpareChunk( ) function returns null if no chunks are available from spares. At block 703 the new chunk is tested for null, and if not null, the stripe replaces a failed chunk at block 704 with the new chunk from hot spares. This involves updating the stripes metadata to include the new chunk, and rebuilding the failed chunk through redundancy info.

Figure 9:
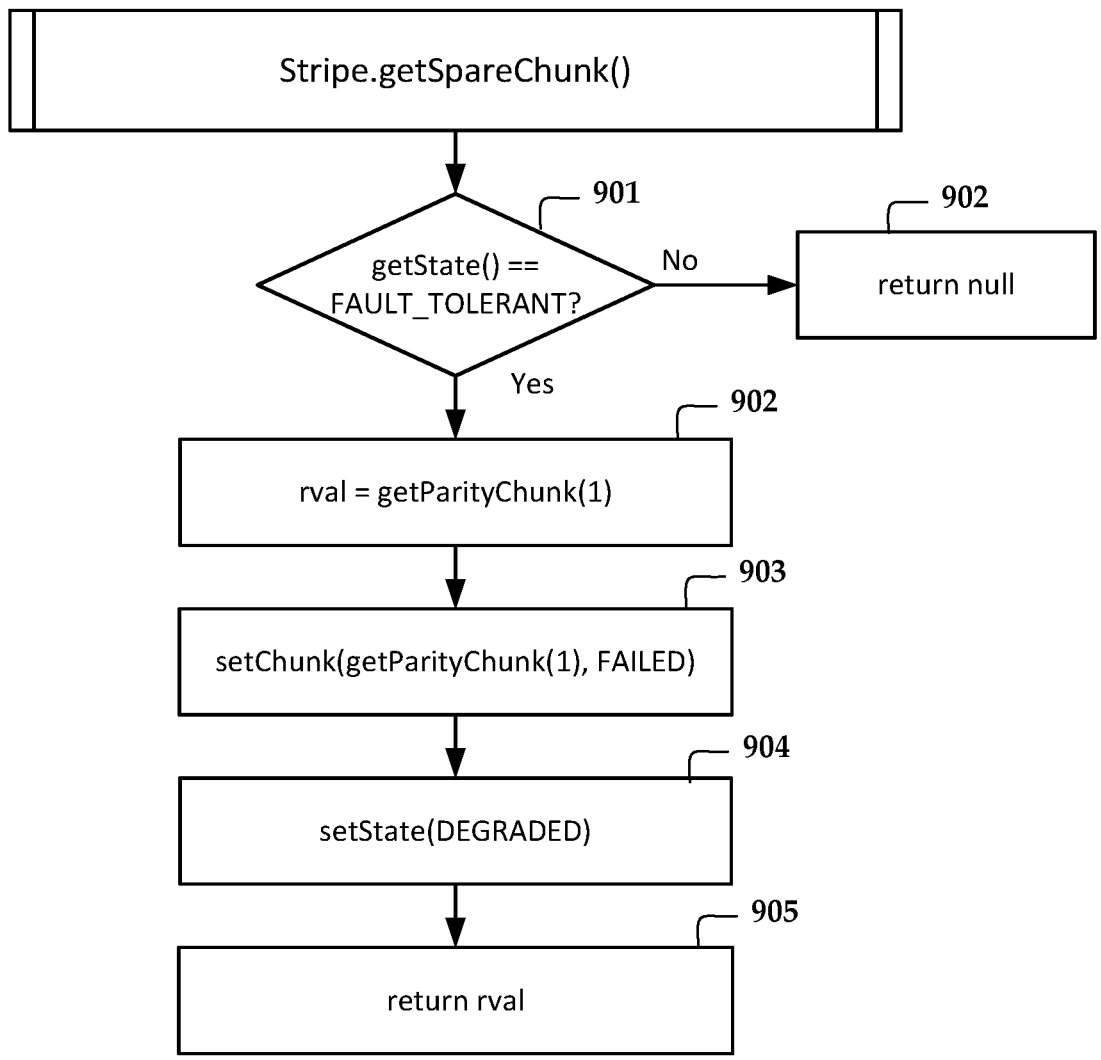

If there are no more spares (block 703 returns 'yes'), then at block 705 the controller attempts to retrieve a spare chunk from other stripes of the group that are in a fault tolerant state. An example implementation of the function in block 705 is shown in the flowchart of FIG. 9 and will be described in detail below. Similar to the function in block 702, the new chunk returned in the function of block 705 will be null if no stripes can spare a chunk, e.g., all are in degraded or critical mode. If a chunk can be found (block 706 returns 'no'), then it is used for repair at block 704, the repair involving updating metadata of the critical stripe to include the new chunk and then rebuilding data onto the new chunk. If block 706 returns 'yes,' then the routine exits at block 707, because at this point neither the hot spares nor the other stripes have any chunks available for repair.

Assuming that the routine in FIG. 7 did not exit at block 707, then once all stripes have been iterated through, the loop exits to reference block 708, which is continued at FIG. 8 for a second pass through the stripes. The flowchart in FIG. 8 is similar to that of FIG. 7, in that all of the stripes are iterated through as indicated by loop limit 800. At block 801, the stripe is tested for a degraded state, which can be repaired by attempting to retrieve a chunk from spares (block 802) and replacing the failed chunk if available (blocks 803 and 804). Unlike FIG. 7, if no hot spares are available, then the routine ends at block 805.

In FIG. 9, a flowchart shows how a stripe in fault-tolerant state may give up a chunk according to an example embodiment via an implementation of the getSpareChunk( ) function shown in block 705 of FIG. 7 and described above. Block 901 is a safety check to ensure the stripe is in the correct state. If so, a chunk to be sacrificed is identified at block 902. In this example, the stripe always gives up its second parity chunk (referenced by indices '0' and '1' in this example) which allows the stripe to transition to a RAID-5 mode, although other criteria may be used for selecting the chunk as described below. The second parity chunk is marked as failed in block 903 (although some other convention may be used instead of marking it as failed) and the stripe's state is changed to degraded at block 904. At block 905, the parity chunk (or an identifier thereof, e.g., disk identifier, partition identifier, logical block addresses, etc.) is returned for use by the caller of the function.

The processes shown in FIGS. 7-9 may be adapted to satisfy particular criteria when selecting chunks from a fault-tolerant stripe for use in repairing a critical stripe. For example, the initial mapping of the stripes may attempt to keep the disk zones used for the chunks within a stripe having the same general performance attributes. As such, the chunks used to repair the stripe should correspond to disk zones that have about the same sequential performance as the failed chunk, e.g., being located in similar radial locations. This may be implemented by defining the desired logical block address (LBA) ranges of the chunks. For drives of the same configuration, the same LBA range will generally correspond to the same radial disk zones over the different drives. Thus, when choosing a chunk to repair a critical stripe that's near the outer diameter (OD) of drives in the group for example, a replacement chunks should also be chosen near the OD, assuming there are multiple stripes/chunks to choose from.

The processes may also set criteria that try to balance the allocated space across all drives in the group. This means keeping spare capacity evenly distributed across all group members. In the case where there are multiple available chunks on fault-tolerant stripes from which to choose, the controller may try to select chunks from disks not already used by the critical stripe. For example, in reference again to FIG. 3, note that chunks from Stripe3 and Stripe4 that are mapped to Drive1 and Drive 2 were used to replace failed chunks on Stripe0 and Stripe1. Thus the chunks of degraded-mode Stripe0 and Stripe1 as seen in FIG. 4 are still distributed across five different disks. This is in contrast to FIG. 6, wherein Stripe0 and Stripe1 have two chunks mapped to the same disk.

Figure 10:
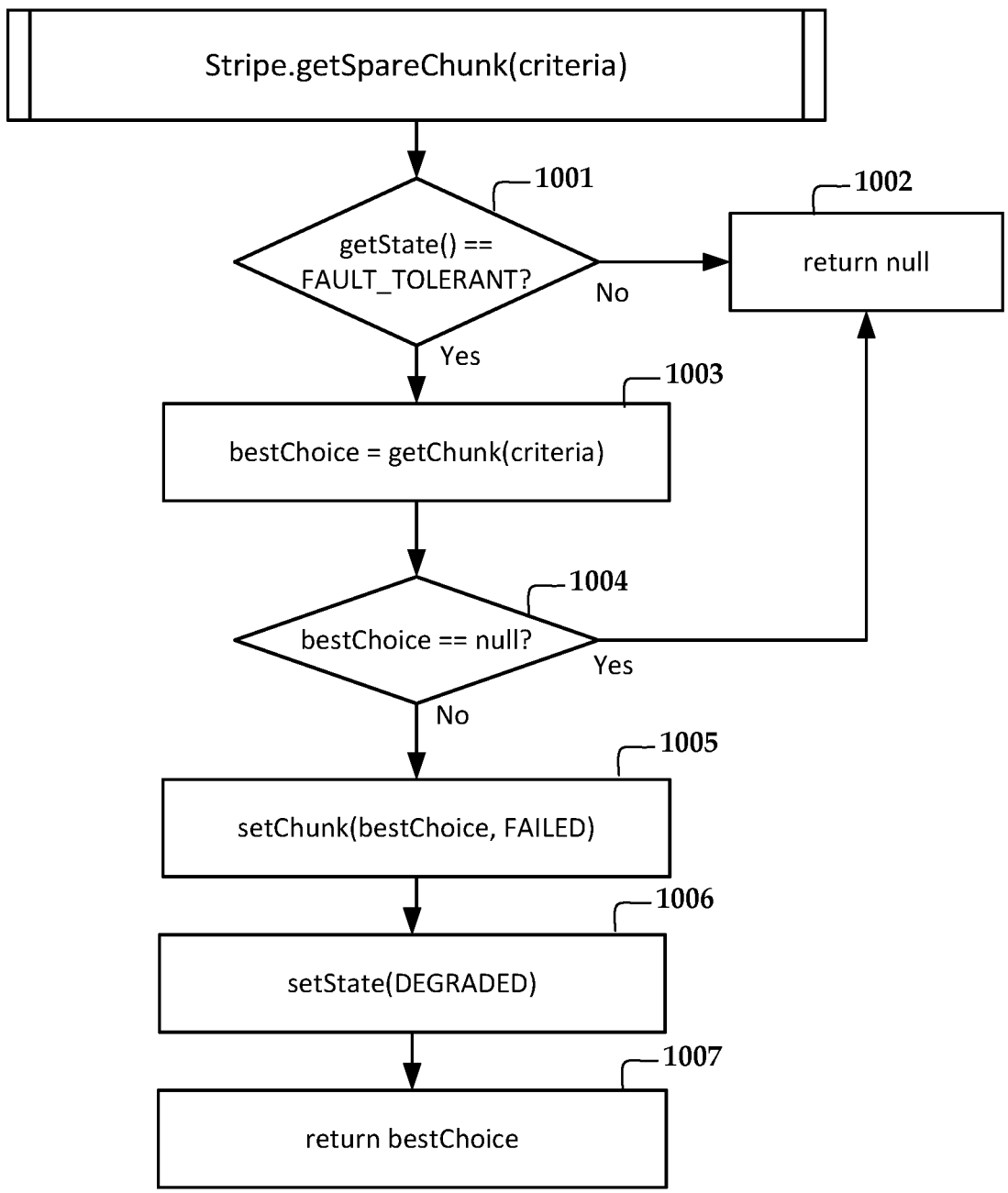

One way to accomplish the use of the above-noted criteria when selecting chunks according to an example embodiment is shown in the flowchart of FIG. 10. This is an alternate implementation of the getSpareChunk( ) function shown in FIG. 9. In this case, the function takes a 'criteria' variable as an input parameter. The criteria variable may include a list of disks desired (or disks not to be used) for the chunk and/or a range of desired LBAs. These may be hard or soft criteria. For example, if hard criteria are used for one or both of disk and LBA, then no chunk will be selected if the stripes chunks do not satisfy the hard criteria. If soft criteria are used, then a score may be calculated based on proximity to the LBA range and a '1' or '0' if the chunk corresponds to a desired drive. Each chunk may be assigned a score and the chunk with the highest score is selected, even if some criteria are not met, such as the chunk being on an undesired disk.

At block 1001, the state of the stripe is again checked and the function exits at block 1002 with a null return value if the stripe cannot spare any chunks. In this example, the criteria is used at block 1003 to select the "bestChoice" chunk to sacrifice. Note that if a hard criteria is used, there may be no chunks that satisfy the criteria, in which case the return value is checked at block 1004 for null, in which case null is returned at block 1002. Otherwise, the stripe sets the chunk as failed at block 1005 (or uses some other mechanism to remove the chunk from use), changes stripe state at block 1006, and returns a reference the chunk at block 1007.

While the embodiments described above describe allocating part of a fault-tolerant raid stripe to a second raid stripe that is in a critical state, other embodiments may instead or in addition allocate part of a non-critical raid stripe to a second raid stripe that is in a critical state. For example, the end-user may have different priorities assigned to the various stripes, such that loss of a volume associated with one stripe is more damaging than loss of another stripe. In such a case, the controller may allocate a chunk from a first stripe in the degraded state to repair a second stripe in the critical stripe. This will leave the first stripe in the critical state and the second stripe in the degraded state. Depending on the relative application-level priorities of the first and second stripes, this may be acceptable in order to reduce failure probability of the second stripe. The processes and examples described above and shown in the figures can be readily modified to implement this embodiment.

Figure 11:
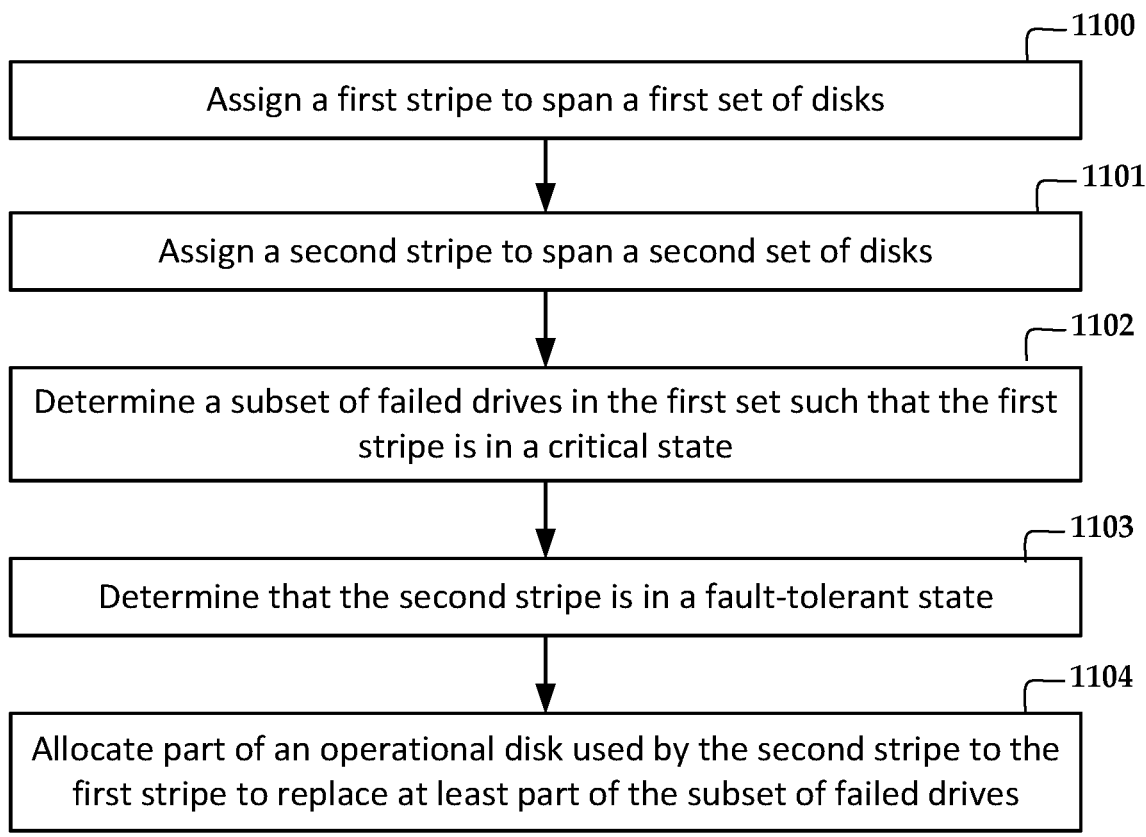
FIGS. 11 and 12 are flowcharts of methods according to example embodiments.

In FIG. 11, a flowchart shows a method according to an example embodiment. The method involves assigning 1100 a first stripe to span a first set of disks. A second stripe is assigned 1101 to span a second set of disks. At least one disk of the second set is not in the first set. A subset of failed drives in the first set is determined 1102 such that the first stripe is in a critical state where a failure of another drive in the first set will lead to data loss in the first stripe. The second stripe is determined 1103 in a fault-tolerant state such that the second stripe can have failures of two drives in the second set before the second stripe is in the critical state. Part of an operational disk of the second set used by the second stripe is allocated 1104 to the first stripe to replace at least part of the subset of failed drives.

Figure 12:
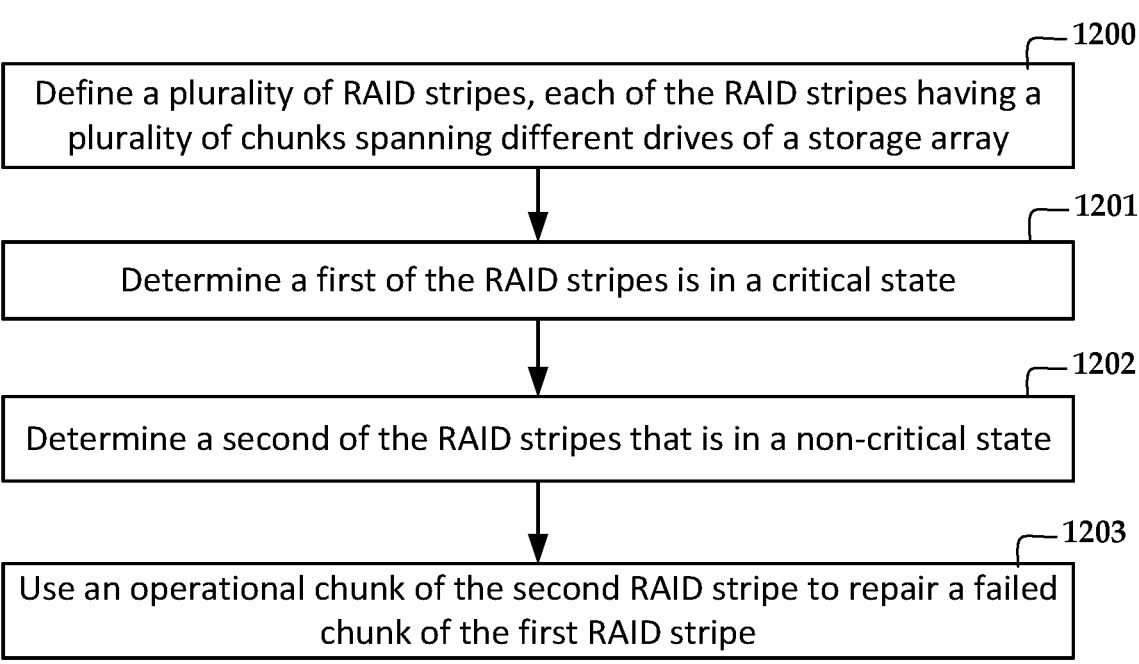

In FIG. 12, a flowchart shows a method according to another example embodiment. The method involves defining 1200 a plurality of RAID stripes. Each of the RAID stripes has a plurality of chunks spanning different drives of the storage array. A first of the RAID stripes is determined 1201 to be in a critical state such that a failure of a currently operational chunk in the first RAID stripe will lead to data loss in the first RAID stripe. A second of the RAID stripes that is in a non-critical state is determined 1202 such that a loss of an operational chunk of the second RAID stripe will cause the second RAID stripe to be in the critical state or a degraded state. The operational chunk of the second RAID stripe is used 1203 to repair a failed chunk of the first RAID stripe.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method of managing a storage array, comprising:
assigning a first stripe to span a first set of disks;
assigning a second stripe to span a second set of disks;
determining a subset of failed drives in the first set such that failure of another drive in the first set will lead to data loss in the first stripe;
determining that the second stripe is in a fault-tolerant state such that the second stripe can have failures of two or more drives in the second set before failure of another drive in the second set will lead to data loss in the second stripe; and
allocating part of an operational disk of the second set used by the second stripe to the first stripe to replace at least part of the subset of failed drives.

2. The method of claim 1, wherein allocating the part of the operational disk to the first stripe results in both the first stripe and the second stripe being in a degraded state, wherein a stripe in the degraded state will lead to data loss only after failure of at least two drives in the stripe.

3. The method of claim 1, wherein the storage array comprises a redundant array of independent disks (RAID) and includes spare disk space, wherein the allocating part of the operational disk step occurs after the spare disk space has been used up.

4. The method of claim 1, wherein the first and second stripes comprise RAID-6 stripes, wherein the RAID-6 stripes are in the fault-tolerant state with no failed chunks and the RAID-6 stripes are in a critical state with two failed chunks such that failure of another drive in a set will lead to data loss in an associated stripe.

5. The method of claim 4, wherein allocating the part of the at least one disk to the first stripe results in both the first stripe and the second stripe being in a degraded state with one failed chunk, the degraded state corresponding to a RAID-5 mode.

6. The method of claim 1, further comprising selecting the part of the operational disk based on the part having a logical block address range similar to that of the at least part of the subset of failed drives.

7. The method of claim 1, further comprising selecting the part of the operational disk based on the operational disk not being part of the first set.

8. The method of claim 1, wherein the drives of the first and second sets partially overlap.

9. A system, comprising:
a storage bus coupled to a storage array that is configured as a redundant array of independent disks (RAM), a first stripe spanning a first set of disks of the storage array and a second stripe spanning a second set of disks; and
a controller coupled to the storage bus and configured to:
determine a subset of failed drives in the first set such that the first stripe is in a critical state where a failure of another drive in the first set will lead to data loss in the first stripe;
determine that the second stripe is in a fault-tolerant state such that the second stripe can have failures of two drives in the second set before the second stripe is in the critical state; and
allocate part of an operational disk of the second set used by the second stripe to the first stripe to replace at least part of the subset of failed drives.

10. The system of claim 9, wherein allocating the part of the operational disk to the first stripe results in both the first stripe and the second stripe being in a degraded state, wherein a stripe in the degraded state will lead to data loss only after failure of at least two drives in the stripe.

11. The system of claim 9, wherein the storage array includes spare disk space, and wherein the allocating of part of the at least one disk from the second stripe to the first stripe to replace at least part the first number of failed drives occurs after the spare disk space has been used up.

12. The system of claim 9, wherein the first and second stripes comprise RAID-6 stripes, wherein the RAID-6 stripes are in the fault-tolerant state with no failed chunks and the RAID-6 stripes are in the critical state with two failed chunks.

13. The system of claim 12, wherein allocating the part of the at least one disk to the first stripe results in both the first stripe and the second stripe being in a degraded state with one failed chunk, the degraded state corresponding to a RAID-5 mode.

14. The system of claim 9, wherein the controller is further configured to select the part of the operational disk based on the part having a logical block address range similar to that of the at least part of the subset of failed drives.

15. The system of claim 9, wherein the controller is further configured to select the part of the operational disk based on the operational disk not being part of the first set.

16. The system of claim 9, wherein the drives of the first and second sets partially overlap.

17. A method comprising:
in a redundant array of independent disks (RAID) storage array, defining a plurality of RAID stripes, each of the RAID stripes having a plurality of chunks spanning different drives of the storage array;
determining a first of the RAID stripes is in a critical state such that a failure of a currently operational chunk in the first RAID stripe will lead to data loss in the first RAID stripe;
determining a second of the RAID stripes that is in a non-critical state such that a loss of an operational chunk of the second RAID stripe will cause the second RAID stripe to be in the critical state or in a degraded state; and
using the operational chunk of the second RAID stripe to repair a failed chunk of the first RAID stripe.

18. The method of claim 17, wherein the repairing of the first RAID stripe comprises allocating the operational chunk of the second RAID stripe to the first RAID stripe.

19. The method of claim 17, wherein the operational chunk of the second RAID stripe is selected based on the operational chunk of the second RAID stripe having a logical block address range similar to that of the failed chunk of the first RAID stripe.

20. The method of claim 17, wherein the operational chunk of the second RAID stripe is selected based on the operational chunk of the second RAID stripe being on a disk not currently used by operational chunks of the first RAID stripe.

* * * * *